United States Patent
Bailey et al.

(10) Patent No.: US 7,861,173 B2
(45) Date of Patent: Dec. 28, 2010

(54) INTERFACE FOR CONFIGURING INTERNET COMMUNICATIONS ON A ZSERIES COMPUTER

(75) Inventors: Bret A. Bailey, Flower Mound, TX (US); Jo Lynn Golden, Colleyville, TX (US)

(73) Assignee: International Business Machines Corporation, Armonk, NY (US)

( * ) Notice: Subject to any disclaimer, the term of this patent is extended or adjusted under 35 U.S.C. 154(b) by 1029 days.

(21) Appl. No.: 10/667,740

(22) Filed: Sep. 22, 2003

(65) Prior Publication Data

US 2005/0066016 A1 Mar. 24, 2005

(51) Int. Cl.
*G06F 15/177* (2006.01)
(52) U.S. Cl. .................. 715/735; 715/740; 709/220; 709/221; 709/222
(58) Field of Classification Search ................ 715/735, 715/740; 709/220–222
See application file for complete search history.

(56) References Cited

U.S. PATENT DOCUMENTS

| | | | | |
|---|---|---|---|---|
| 5,778,387 | A * | 7/1998 | Wilkerson et al. ............ | 707/202 |
| 5,825,361 | A * | 10/1998 | Rubin et al. ................ | 715/839 |
| 6,314,516 | B1 * | 11/2001 | Cagle et al. .................... | 713/1 |
| 2001/0025247 | A1 * | 9/2001 | Nagai et al. .................... | 705/7 |
| 2001/0056476 | A1 * | 12/2001 | Benayoun et al. ........... | 709/218 |
| 2002/0052935 | A1 * | 5/2002 | Paxhia et al. ................. | 709/220 |
| 2002/0120433 | A1 * | 8/2002 | Foertsch et al. ............... | 703/22 |
| 2003/0055863 | A1 * | 3/2003 | Spiegel et al. ............... | 709/104 |
| 2003/0132956 | A1 * | 7/2003 | Duncan et al. .............. | 345/735 |
| 2004/0044643 | A1 * | 3/2004 | deVries et al. ................. | 707/1 |

FOREIGN PATENT DOCUMENTS

WO WO 02/03201 1/2002

OTHER PUBLICATIONS

Powers et al., "IBM Server iSeries System Handbook", published Sep. 2002, relevant pp. 1-59.*
Hirosawa, T., et al., "Dev. of a Sys. Oper. Vicarious Execution Function of Mainframe Comp. Systems by the Pers. Comp. Control", Info. Proc. Soc. of JP, vol. 41, #9, Sep. 2000.
"ISPF for z/OS—Features and Benefits—IBM Software", IBM Corp., viewed Sep. 8, 2003.

* cited by examiner

*Primary Examiner*—Weilun Lo
*Assistant Examiner*—Tuyetlien T Tran
(74) *Attorney, Agent, or Firm*—Novak Druce + Quigg LLP

(57) ABSTRACT

A method for configuring Internet settings on a zSeries compatible computer can include the step of providing a graphical user interface including at least one control. The graphical user interface can be configured for a multiple virtual storage operating system, an OS/390 operating system, and/or a z/OS operating system. Data contained within at least one configuration file containing Internet settings for the zSeries compatible computer can be accessed. The accessed data can be displayed within the graphical user interface. Data within the configuration file can also be altered responsive to manipulation of the control.

11 Claims, 2 Drawing Sheets

INTERFACE FOR CONFIGURING INTERNET COMMUNICATIONS ON A ZSERIES COMPUTER

BACKGROUND

1. Field of the Invention

The present invention relates to the field of computer software and, more particularly, to a graphical user interface for establishing Transmission Control Protocol/Internet Protocol (TCP/IP) connectivity on a zSeries (R) computer.

2. Description of the Related Art

A zSeries (R) computer is a product line of large computer servers or mainframes based on the z/Architecture (TM) provided by International Business Machines Corporation (IBM) of Armonk, N.Y. ZSeries computers can utilize a derivative of the Multiple Virtual Storage (MVS) operating system, which is a robust mainframe operating system utilized by many generations of IBM (R) mainframe computers. Derivatives of the MVS (TM) operating system can include the OS/390 (R) operating system and z/OS (R). Each of these operating systems support message conveyance through Transmission Control Protocol/Internet Protocol (TCP/IP).

In order to exchange messages using TCP/IP, however, a zSeries computer must be properly configured for TCP/IP messaging. Configuring the zSeries computer involves setting parameters of designated configuration files to appropriate settings. Traditionally, manipulations of TCP/IP configuration files has been a manual process requiring system administrators to open a configuration file, edit one or more parameters, and subsequently save the modified configuration file. Manually manipulating TCP/IP configuration files, however, can be a challenging experience for unwary administrators, as many seemingly reasonable configuration settings are mutually exclusive of one another. Therefore, the manual manipulation of configuration files on zSeries computers can often result in the creation of configuration errors. Although zSeries computers have been extensively utilized for more than a decade, no graphical user interfaces (GUIs) have been developed to facilitate configuring zSeries computers for TCP/IP messaging.

SUMMARY OF THE INVENTION

The present invention provides a method, a system, and an apparatus for integrating a graphical user interface (GUI) into zSeries (R) computers for configuring Internet communications. More specifically, a GUI for manipulating Transmission Control Protocol/Internet Protocol (TCP/IP) configuration files of a zSeries computer can be integrated with an Interactive System Productivity Facility (ISPF) for the zSeries computer. It should be noted that the ISPF is the user interface of a zSeries computer that permits authorized administrators to configure and manage the features of the zSeries computer. By integrating a TCP/IP configuration GUI with the ISPF, a consistent and more comprehensive administrative environment can be established. In one embodiment, access to the TCP/IP configuration GUI of the ISPF can be selectively restricted to reduce potential security breaches. In another embodiment, automatic detection and optimization features can be included within the TCP/IP configuration GUI to facilitate the configuration process. Further, autonomic features can be enabled by the TCP/IP configuration GUI that permit specified dynamic adjustments to be situationally performed to minimize downtime. In still another embodiment, the TCP/IP configuration GUI can include syntax and error checking features to pinpoint and alleviate problematic configuration settings.

One aspect of the present invention can include a method for configuring Internet settings on a zSeries computer. The method can include the step of providing a GUI, which includes one or more controls. The GUI can be configured for a multiple virtual storage (MVS) operating system, an OS/390 (R) operating system, and/or a z/OS (R) operating system. The GUI can also be integrated with an ISPF of the zSeries computer. Data contained within at least one configuration file that contains Internet settings for the zSeries computer can be accessed. The accessed data can be displayed within the GUI. Data within the configuration file can also be altered responsive to activities performed within the GUI. Additionally, the configuration file can include Transmission Control Protocol/Internet Protocol (TCP/IP) configuration settings that can be displayed and altered via the GUI.

In one embodiment, help relating to configuring Internet communication settings of the zSeries computer can be accessed using the GUI. In another embodiment, a selection list that includes a multitude of user-selectable settings for one or more configuration parameters of the configuration file can be provided within the GUI. The configuration parameters of the configuration file can be updated responsive to a selection within the selection list. Further, multiple ones of the configuration files can be synchronized using the GUI. Additionally, a validity of one or more parameters stored within the configuration file can be checked using the GUI.

Another aspect of the present invention can include a GUI for a zSeries computer. The GUI can include multiple interface elements. At least a portion of the interface elements can display data derived from a flat file of the zSeries computer. The flat file can include TCP/IP configuration settings for the zSeries computer. Selection of at least a portion of the interface elements can alter one or more of the TCP/IP configuration settings of the flat file. The GUI can be integrated within an ISPF of the zSeries computer. Further, at least a portion of the interface elements within the GUI can accept input. The input can be restricted to prevent invalid configuration settings from being written to the flat file. The GUI can also be configured to validate configuration settings within the flat file. Additionally, at least a portion of the interface elements of the GUI can display help information relating to configuring TCP/IP settings for the zSeries computer.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

Figure 1:
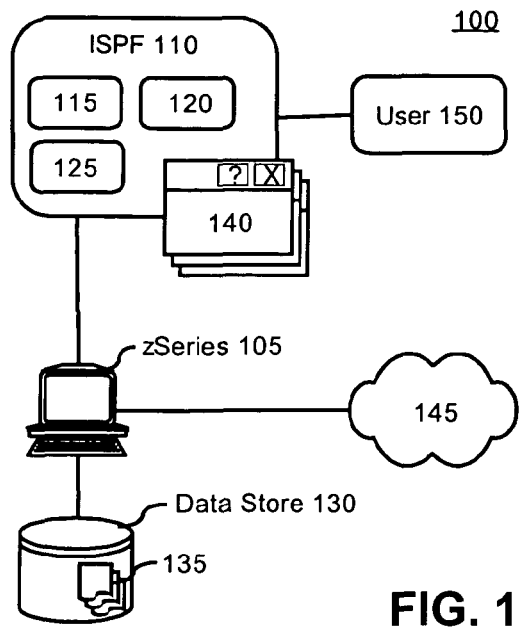
FIG. 1 is a schematic diagram of a system for configuring a zSeries computer according to the inventive arrangements disclosed herein.

FIG. 1 is a schematic diagram of a system 100 for configuring a zSeries (R) compatible computer 105 according to the inventive arrangements disclosed herein. The system 100 can include a zSeries computer 105, an Interactive System Productivity Facility (ISPF) 110, and a configuration graphical user interface (GUI) 140. The zSeries computer 105 can be any computer based on the z/Architecture (R) family. The z/Architecture (R) family includes the succession of backwards compatible architectures for mainframe computers beginning with the System/360 (TM) architecture and includes, but is not limited to, System/370, System/370 Extended Architecture 370-XA, Enterprise Systems Architecture(ESA)/370, Enterprise Systems Architecture/390 (ESA/390), the z/Architecture, and future z/Architecture type architectures which maintain backwards compatibility with the present z/Architecture family. Accordingly, the zSeries computer 105 can be any of a variety of computers that are part of a specific product line developed by International Business Machines Corporation (IBM) of Armonk, N.Y., presently referred to as belonging to the z/Series platform, which includes clones of a zSeries computer. Additionally, the zSeries computer 105 can be configured to utilize the z/OS (R) operating system, the OS/390 (R) operating system, and/or the Multiple Virtual Storage (MVS) operating system.

Communication protocol settings for the zSeries computer 105 can be specified within one or more configuration files 135 disposed within a data store 130 accessible by the zSeries computer 105. The configuration files 135 can include one or more flat files containing Transmission Control Protocol/Internet Protocol (TCP/IP) configuration information. The TCP/IP configuration flat files can include parameters that the operating system of the zSeries computer 105 uses to enable TCP/IP communications. Once TCP/IP protocols have been enabled for the zSeries computer 105, electronic messages following TCP/IP conventions can be exchanged across a network 145 between the zSeries computer 105 and other computing devices.

The configuration GUI 140 can permit an authorized user 150 to access, edit, and otherwise manipulate the configuration files 135. For example, the configuration GUI 140 can include a variety of windows and/or visual controls for displaying configuration information in a manner meaningful to the user 150. The displayed configuration information can be populated from data contained in the configuration files 135. Further, the configuration GUI 140 can include a multitude of user-selectable controls, such as text boxes, list boxes, pull down menus, radio buttons, command buttons, and the like. Manipulations of the user-selectable controls by user 150 can result in changes being made to the configuration files 135. In one embodiment, the configuration GUI 140 can be integrated with the ISPF 110 provided by IBM as part of the zSeries platform.

The ISPF 110 can be an interface component for the z/OS, OS/390, and MVS operating systems. More specifically, the ISPF 110 can be a multifaceted development tool set used for host-based application development productivity. The ISPF 110 can include a dialog manager 115, a program development facility 120, and a software configuration library manager 125.

The dialog manager 115 can provide services to dialogs and end users. The services provided by the dialog manager 115 can include display, variable services, input and output, user and application profiles, table management, system interface services, dialog testing and debugging aids, and the like.

The program development facility 120 can provide a myriad of services to assist dialog and/or application developers. Services of the program development facility 120 include edit and browse functions, data set and catalog utilities, command interfaces, and data set search and compare functions.

The software configuration library manager 125 can include a variety of source code management capabilities, such as versioning capabilities, auditing capabilities, and promotion capabilities. The software configuration library manager 125 can also provide configuration capabilities for integrating numerous project elements, such as source code, run time objects, software loads, test cases, documentation, and the like.

Figure 2:
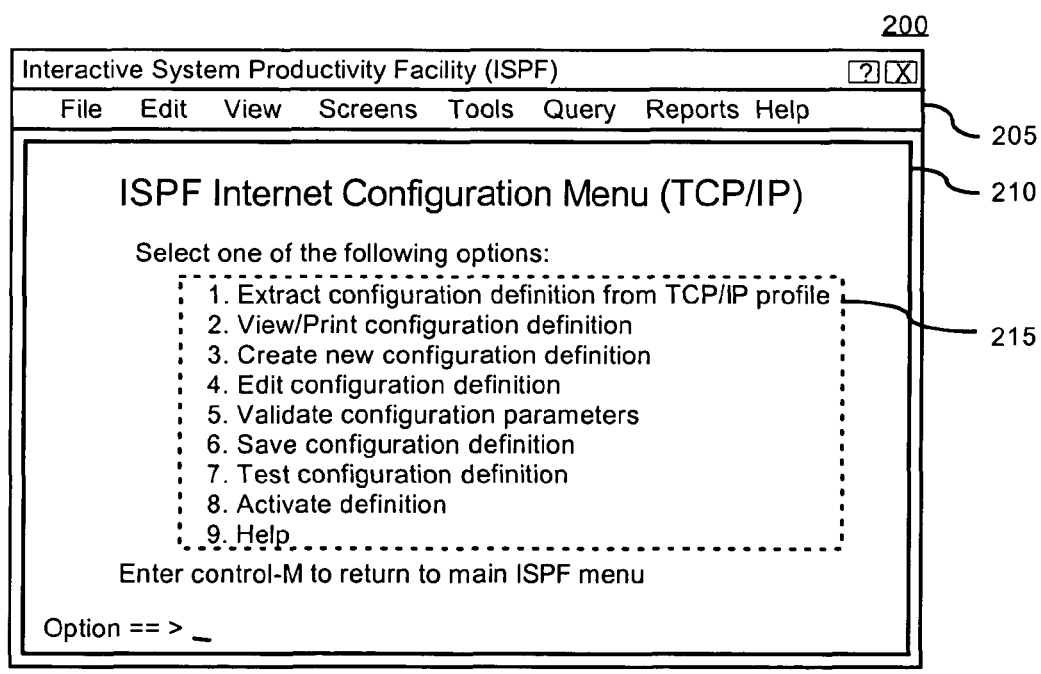
FIG. 2 is an exemplary graphical user interface (GUI) for configuring Internet communications for a zSeries computer in accordance with the inventive arrangements disclosed herein.

FIG. 2 is an exemplary GUI 200 for configuring Internet communications for a zSeries computer in accordance with the inventive arrangements disclosed herein. The zSeries computer can include at least one configuration file that establishes Internet communications for the zSeries device including the configuration of TCP/IP messaging. GUI 200 can display information from TCP/IP configuration files and modify parameters within the referenced TCP/IP configuration files. The GUI 200 can be written for any operating system native to the zSeries computer including, but not limited to, z/OS, OS/390, MVS, and Linux.

Further, the ISPF client/server component for the zSeries computer can include libraries that permit workstations to display GUI 200 within a panel of a workstation using the native display function of the workstation's operating system. Accordingly, GUI 200 can be displayed within a workstation utilizing other operating systems, such as the OS/2 operating system provided by IBM and the Microsoft Windows operating system provided by Microsoft Corporation of Redmond, Wash. It should be appreciated that the GUI 200 can be incorporated within any client application and/or browser that is communicatively linked to the zSeries computer. When GUI 200 is so incorporated, the GUI 200 can run on any operating system that is used by the computer hosting the client application.

The GUI 200 can include a menu 205, a portal 210, and multiple configuration options 215. The menu 205 can activate user-selectable functions related to configuring the TCP/IP settings of the zSeries computer and relating specifically to the GUI 200. For example, the menu 205 can contain any of a variety of commonly utilized menu elements including, but not limited to, file, edit, view, screen, tool, query, report, and help elements.

In one embodiment, the portal 210 can be a panel for accessing the functions GUI 200 from a workstation external to the zSeries computer. When the portal 210 functions as such a panel, the included Internet configuration options can be implemented in a menu-based and text-based fashion as well as in a pure GUI-based manner. Accordingly, GUI 200 can integrate legacy text-based capabilities of the zSeries computer, menu-driven capabilities, and GUI capabilities within a single interface. In another embodiment, the portal 210 can be a GUI window containing GUI controls for displaying and modifying the TCP/IP configuration of an associated zSeries computer.

The configuration options 215 can permit a user to transparently access data from an appropriate configuration file, display the configuration data within the GUI 200, and modify the appropriate settings in accordance with choices made within the GUI 200. That is, the configuration options 215 can include any of a variety of options that facilitate user modification of Internet configuration settings without the need of manually opening and editing a related configuration file. Exemplary configuration options 215 can include, but are not limited to: (1) an option to automatically extract configuration definition information from a TCP/IP profile specified within one or more configuration files, (2) a view and/or print configuration definition capability, (3) an option to facilitate the creation of a new configuration definition, (4) an edit configuration definition option, (5) a validate configuration parameters option, (6) a save configuration definition option, (7) a test configuration definition option, (8) an activate definition option, and/or (9) a help option.

Figure 3:
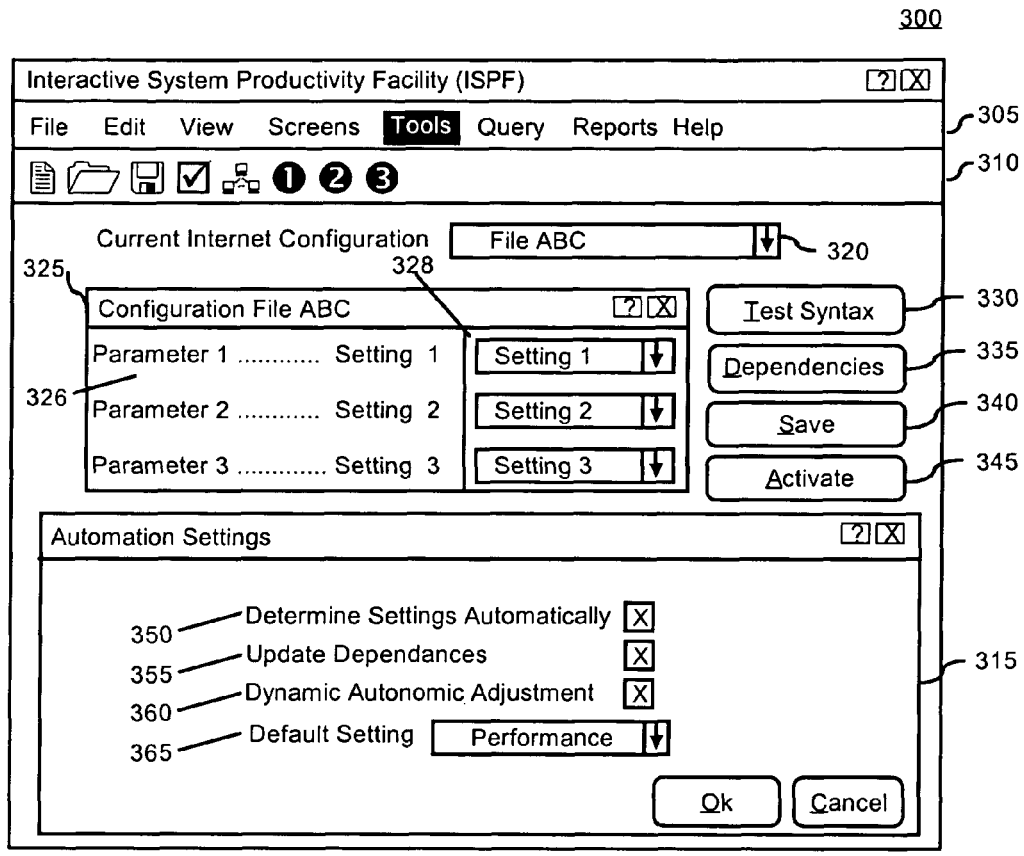
FIG. 3 is another exemplary GUI for configuring Internet communications for a zSeries computer in accordance with the inventive arrangements disclosed herein.

FIG. 3 is an exemplary GUI 300 for configuring Internet communications for a zSeries computer in accordance with the inventive arrangements disclosed herein. As with the GUI 200, GUI 300 can perform one or more operations against configuration files that establish Internet configurations for a zSeries computer. The GUI 300 can include a menu 305, a toolbar 310, a settings section 315, and a configuration section 325. The menu 305 and the toolbar 310 can include any of a variety of user-selectable options relating to configuring TCP/IP messaging on a zSeries computer.

The settings section 315 can allow an authorized user to selectively enable or disable Internet configuration features of the zSeries computer. For instance, an option 350 for enabling automatic settings can be provided. Additionally, option 355 for updating dependencies can be presented. It should be noted that many different configuration parameters selected within the GUI 300 can have an effect on multiple settings within configuration files. Option 355 can permit GUI 300 to automatically update each of the related multiple settings whenever a change is made to a related and interdependent setting using the GUI 300. Option 360 can activate dynamic autonomic adjustments. That is, zSeries computers can possess automatic error correcting features such as dynamically rerouting communications to prevent problems and downtime. Option 360 enables an authorized administrator to selectively permit these dynamic adjustments, which can affect settings of the configuration files controlling Internet communications. Option 365 can permit the selection of user preference criteria. Whenever configuration decisions are automatically made by the zSeries computer, the criteria established by option 365 can be taken into account. Exemplary settings for option 365 can include performance, stability, efficiency, and the like.

The configuration section 325 can display data derived from one or more configuration files. In one embodiment, the configuration file data displayed within configuration section 325 can be determined by the file specified by selection box 320. The configuration section 325 can include a setting display segment 326 and a setting selection segment 328. The setting display segment 326 can be a read-only display section showing parameters and associated settings within a configuration flat file for the zSeries computer. The setting selection segment 328 can permit a user to modify one or more configuration settings. The setting selection segment 328 can restrict the user to a range of potential settings for configuration parameters and/or to a previously restricted list of values valid for the corresponding configuration parameter.

In one embodiment, a test button 330 can verify that settings established in the configuration section 325 are syntactically valid. Additionally, a dependencies button 335 can update dependencies existing between different configuration files. Alternately, the dependencies button 335 can activate one or more routines to assure that conflicting configuration settings have not been established. Appreciably, different ones of the configuration settings stored within the flat files of the zSeries computer can be mutually exclusive of one another. A save button 340 can cause any modifications made within the settings section 315 and the configuration section 325 to be preserved. An activate button 345 can update the configuration of the zSeries to correspond to the settings established with the GUI 300.

Figure 4:
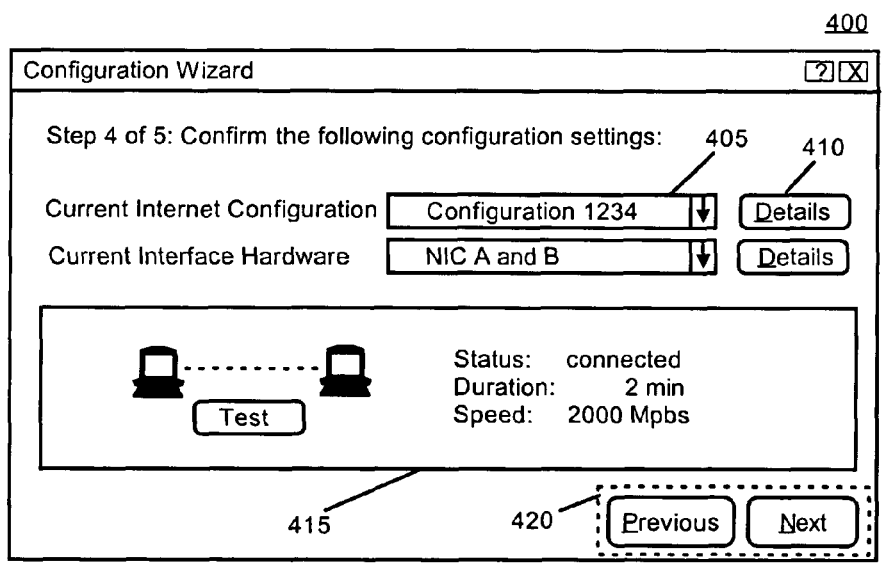
FIG. 4 is yet another exemplary GUI for configuring Internet communications for a zSeries computer in accordance with the inventive arrangements disclosed herein.

FIG. 4 is an exemplary GUI 400 for configuring Internet communications for a zSeries computer in accordance with the inventive arrangements disclosed herein. The GUI 400 can be one of a series of screens that guide a user through a series of stages for configuring files that establish Internet communication settings for the zSeries computer. Segmenting an otherwise complex process into a sequence of discretely presented windows, as shown in GUI 400, can be referred to as providing a "wizard" for configuring Internet communication settings of the zSeries computer.

The GUI 400 can display a series of previously designated configuration settings within a configuration list box 405. A default value for the configuration list box 405 can be provided initially. Further, details concerning the setting displayed in the configuration list box 405 can be displayed whenever a details button 410 is activated. The connection status segment 415 can display the current networking status of the zSeries computer and can perform basic connectivity tests. If the connection status segment 415 indicates a lack of network connectivity, troubleshooting suggestions and/or help can be displayed. Finally, the GUI 400 can include navigation buttons 420 for navigating from one screen of the configuration wizard to another.

The various GUIs disclosed herein are shown for purposes of illustration only. Accordingly, the present invention is not limited by the particular GUI or data entry mechanisms contained within views of the GUI. Rather, those skilled in the art will recognize that any of a variety of different GUI types and arrangements of data entry, fields, selectors, and controls can be used.

The present invention can be realized in hardware, software, or a combination of hardware and software. The present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A method for configuring Transmission Control Protocol/Internet Protocol (TCP/IP) settings, the method comprising the steps of:
   providing a mainframe computer having only a non-graphical user interface for manually manipulating TCP/IP configuration flat files;
   providing a graphical user interface for configuring the TCP/IP settings, the graphical user interface including at least one control, wherein said graphical user interface is configured for at least one of a 32-bit multiple virtual storage operating system and a 64-bit multiple virtual storage operating system of the mainframe computer;
   integrating the graphical user interface into the non-graphical user interface, wherein said graphical user interface is integrated with an interface component of the at least one of a 32-bit multiple virtual storage operating system and a 64-bit multiple virtual storage operating system of said mainframe computer;
   accessing data contained within at least one configuration flat file containing the TCP/IP settings for said computer;
   displaying the TCP/IP settings based upon said accessed data within said graphical user interface;
   altering one or more of said displayed TCP/IP settings using said at least one control in the graphical user interface; and
   updating the at least one configuration flat file according to the altered TCP/IP settings.

2. The method of claim 1, further comprising the step of:
   displaying help relating to configuring TCP/IP communication settings of said computer within said graphic user interface.

3. The method of claim 1, further comprising the steps of:
   providing a selection list within said graphical user interface, said selection list including a multitude of user-selectable settings for at least one configuration parameter of said configuration flat file; and
   updating said configuration parameter responsive to a selection within said selection list.

4. The method of claim 1, further comprising the step of:
   synchronizing multiple ones of said at least one configuration flat file using said graphical user interface.

5. The method of claim 1, further comprising the step of:
   checking a validity of at least one parameter stored within said configuration flat file using said graphical user interface.

6. A computer device having a display and having stored thereon, a computer program having a plurality of code sections, said code sections executable by a computer for causing the computer to perform a method for configuring Transmission Control Protocol/Internet Protocol (TCP/IP) settings, the method comprising the steps of:
   providing a mainframe computer having only a non-graphical user interface for manually manipulating TCP/IP configuration flat files;
   providing a graphical user interface for configuring the TCP/IP settings, the graphical user interface including at least one control, wherein said graphical user interface is configured for at least one of a 32-bit multiple virtual storage operating system and a 64-bit multiple virtual storage operating system of the mainframe computer;
   integrating the graphical user interface into the non-graphical user interface, wherein said graphical user interface is integrated with an interface component of the at least one of a 32-bit multiple virtual storage operating system and a 64-bit multiple virtual storage operating system of said mainframe computer;
   accessing data contained within at least one configuration flat file containing the TCP/IP settings for said computer;
   displaying the TCP/IP settings based upon said accessed data within said graphical user interface;
   altering one or more of said displayed TCP/IP settings using said at least one control in the graphical user interface; and
   updating the at least one configuration flat file according to the altered TCP/IP settings.

7. The computer device of claim 6, further comprising the step of:
   displaying help relating to configuring TCP/IP communication settings of said computer within said graphic user interface.

8. The computer device of claim 6, further comprising the steps of:
   providing a selection list within said graphical user interface, said selection list including a multitude of user-selectable settings for at least one configuration parameter of said configuration file; and
   updating said configuration parameter responsive to a selection within said selection list.

9. The computer device of claim 6, further comprising the step of:
   synchronizing multiple ones of said at least one configuration file using said graphical user interface.

10. The computer device of claim 6, further comprising the step of:
    checking a validity of at least one parameter stored within said configuration file using said graphical user interface.

11. A system for configuring Transmission Control Protocol/Internet Protocol (TCP/IP) settings, the system comprising:
    a mainframe computer having only a non-graphical user interface for manually manipulating TCP/IP configuration flat files;
    means for providing a graphical user interface including at least one control for configuring said TCP/IP settings, wherein said graphical user interface is configured for at least one of a 32-bit multiple virtual storage operating system and a 64-bit multiple virtual storage operating system of the mainframe computer;
    means for integrating the graphical user interface into the non-graphical user interface, wherein said graphical user interface is integrated with an interface component of the at least one of a 32-bit multiple virtual storage operating system and a 64-bit multiple virtual storage operating system of said mainframe computer;
    means for accessing data contained within at least one configuration flat file containing the TCP/IP settings for said computer;
    means for displaying the TCP/IP settings based upon said accessed data within said graphical user interface;
    means for altering one or more of said displayed TCP/IP settings using said at least one control in the graphical user interface; and
    means for updating the at least one configuration flat file according to the altered TCP/IP settings.

* * * * *